June 5, 1956 — A. B. SEGUR — 2,748,957
SYSTEM OF HANDLING BRICK AND SIMILAR ARTICLES
Filed Nov. 4, 1952 — 4 Sheets-Sheet 1
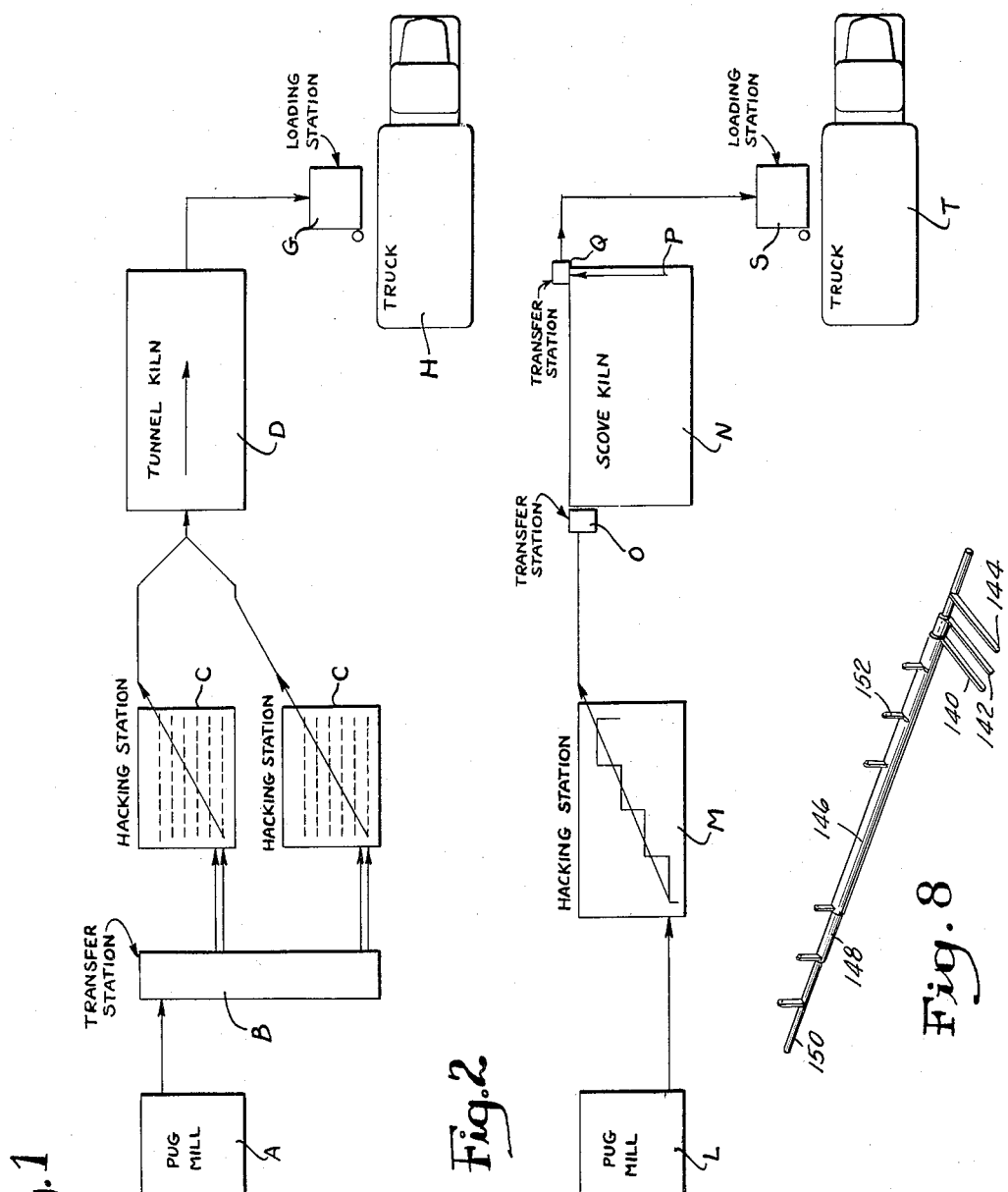
INVENTOR.
Asa B. Segur
BY Mann, Brown and Hausmann
Attys.

INVENTOR.
Asa B. Segur

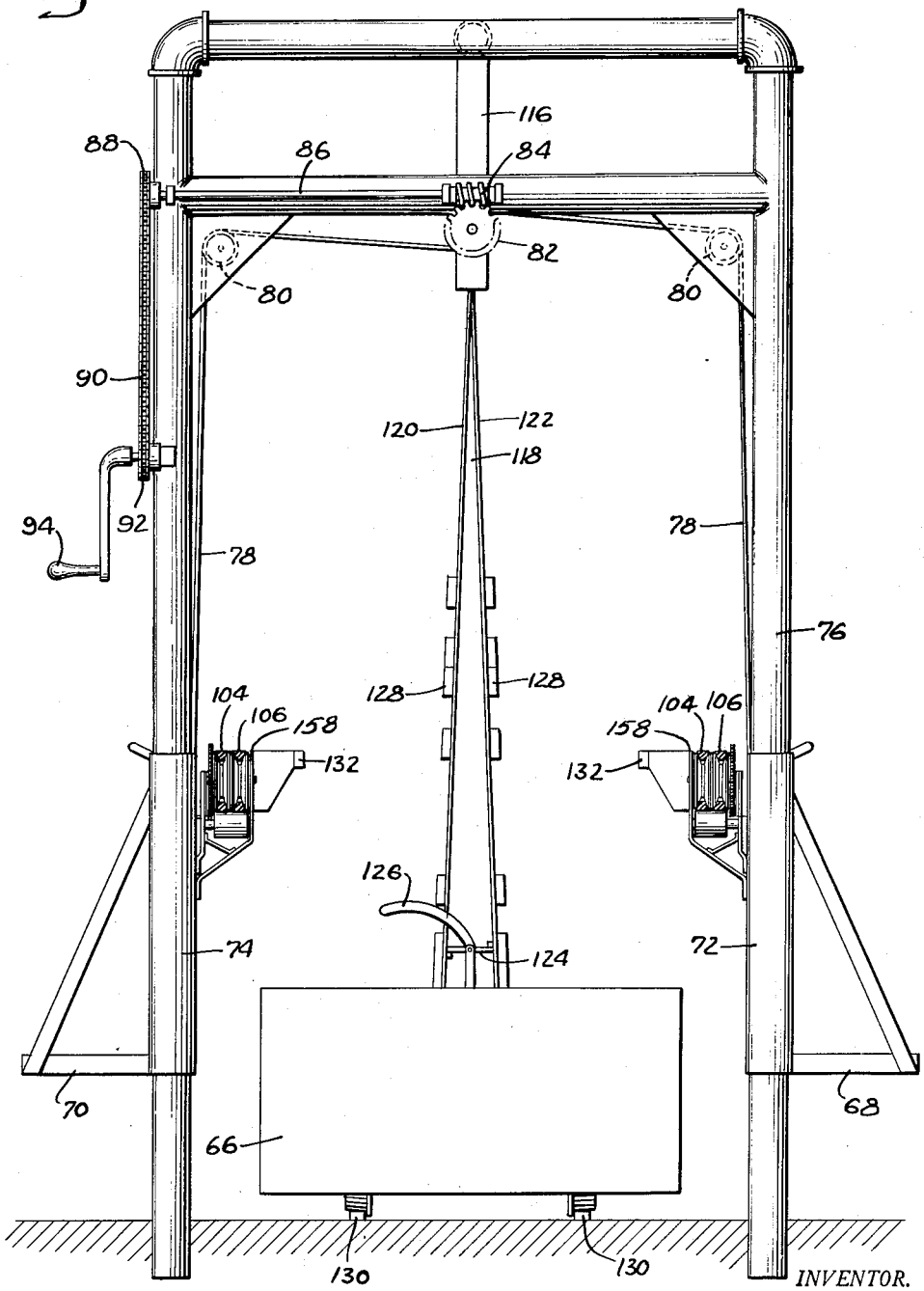

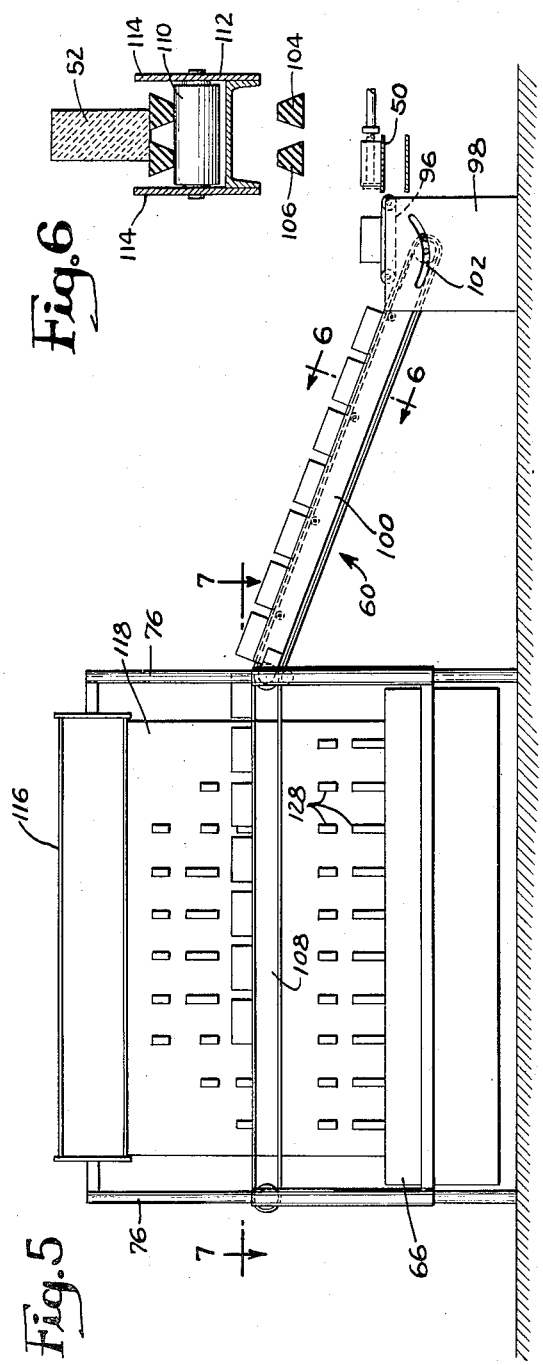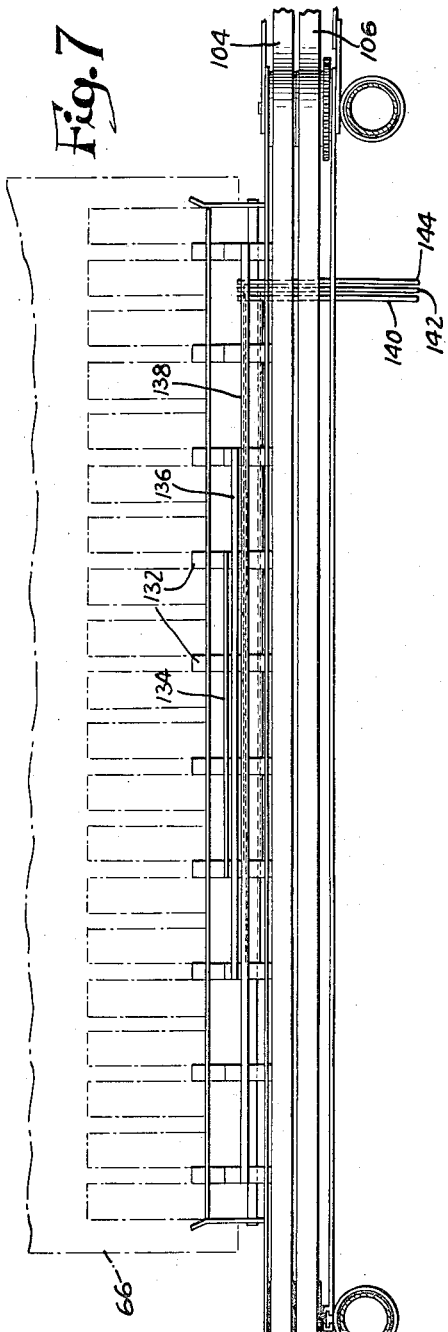

United States Patent Office 2,748,957
Patented June 5, 1956

2,748,957
SYSTEM OF HANDLING BRICK AND SIMILAR ARTICLES

Asa B. Segur, Oak Park, Ill.

Application November 4, 1952, Serial No. 318,554

14 Claims. (Cl. 214—6)

My invention relates to a system of handling brick and similar articles, and while it is particularly applicable to the handling of conventional brick for building purposes, it is capable of use for the handling of tile and other ceramic products of a similar nature.

In the manufacture of brick as presently carried on, there are many stooping, bending, and other fatiguing and distasteful manual operations which quickly tire the workman and make it difficult to secure and keep workmen on such operations. Furthermore, the utilization of the workman's time and energy is poorly employed with resulting inefficiency and relatively low productivity. Likewise, present procedures and equipment result in a substantial loss of product through faulty handling.

An object of my invention is to overcome these difficulties of the prior art and to provide a new and improved system of handling brick and like material which eliminates or substantially reduces the fatiguing manual operations, employs the workman's time and energy more efficiently, increases the daily output of workmen and apparatus, reduces labor turnover, reduces loss due to mishandling, and reduces the overall cost of operation.

Another object of my invention is to provide improved apparatus for carrying out certain operating steps of the system.

Other objects and advantages will become apparent as the description proceeds.

In the drawings:

Fig. 1 is a schematic diagram illustrating the various operating steps in one form of my novel system and the sequential relationship of such steps;

Fig. 2 is a view similar to Fig. 1 but illustrating a modified form of my system of handling brick and other articles;

Fig. 4 is a vertical cross section on an enlarged scale taken on the line 4—4 of Fig. 3;

Fig. 5 is a side elevational view of the transfer mechanism and hacking station of Fig. 3;

Fig. 6 is a transverse sectional view showing the conveyor mechanism on an enlarged scale and is taken on the line 6—6 of Fig. 5;

Fig. 7 is a partial horizontal sectional view on an enlarged scale taken on the line 7—7 of Fig. 5; and Fig. 8 is a perspective view of the operating mechanism for the retractible edge guides.

Figure 3:
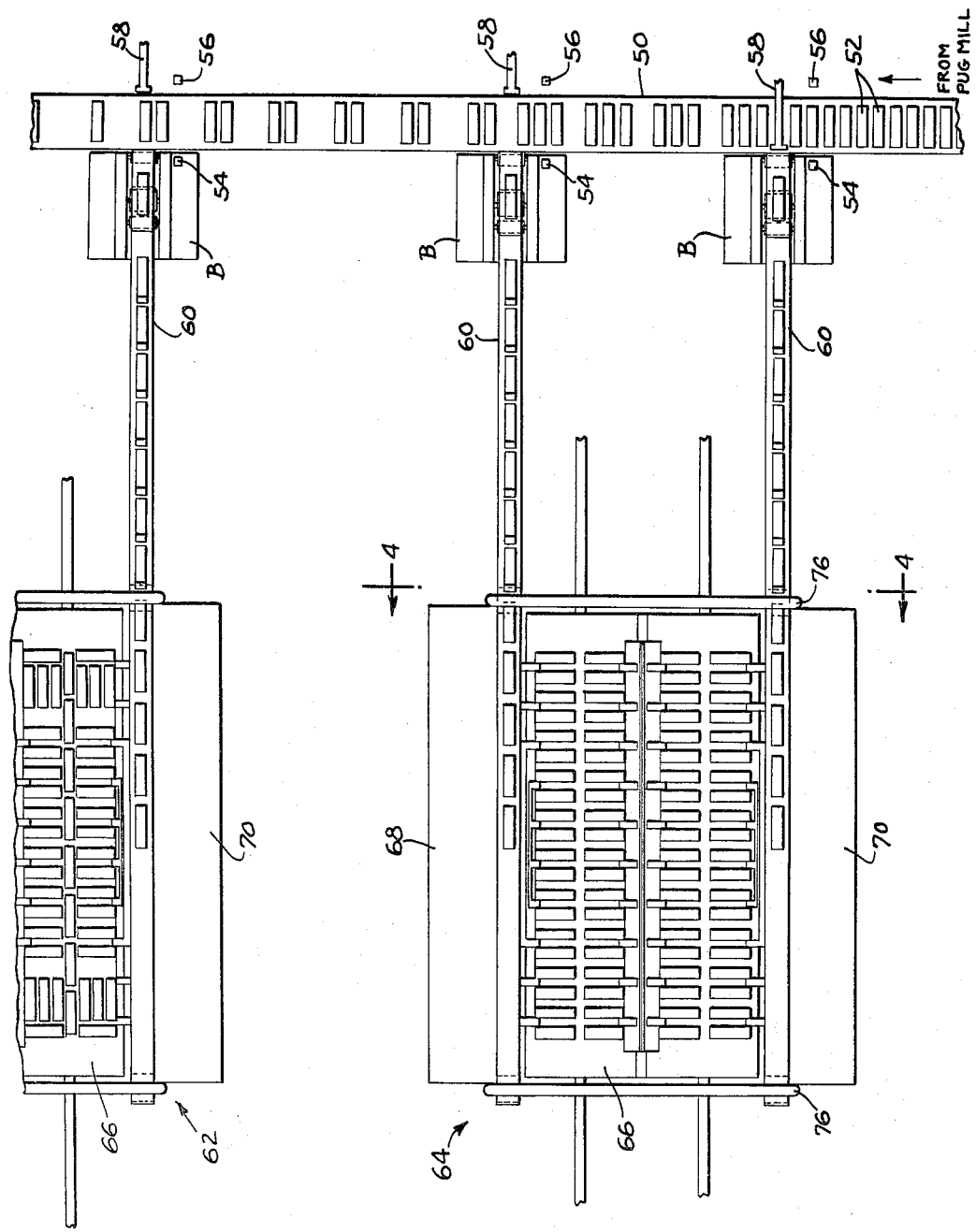
Fig. 3 is a schematic top plan view illustrating a novel form of transfer mechanism and brick hacking station for tunnel kiln cars.

In the schematic diagram of Fig. 1, I have indicated the various operating steps and apparatus therefor, showing generally the transfer of the brick or other like material from one piece of apparatus to another. In general I have shown a source such as a pug mill A from which the brick blanks are transported by a suitable conveyor to a transfer station or series of transfer stations B which split up the stream of brick blanks received from the pug mill and deliver lesser streams to the hacking stations C where the blanks are stacked in predetermined patterns upon cars which carry the blanks thus stacked through a tunnel kiln D. In this kiln the blanks are fired and converted into brick which the cars then transport to a loading station G where they are placed upon a motor truck H or other transportation vehicle.

In Fig. 2 I have shown a modification of my system wherein the brick blanks formed in the pug mill L are transported to a hacking station M where the blanks are loaded upon cars which transport the blanks to a scove kiln N. Here a crane or other suitable transfer means removes the blanks from the cars and stacks them in the scove kiln. This operation is indicated by the transfer station O. After the blanks have been suitably fired and curved in the scove kiln, they may be unstacked and placed upon a conveyor indicated by the arrow P and transported to a transfer station Q from whence they are conducted to a loading station S for loading on a truck T or other suitable conveyance.

The embodiments of Figs. 1 and 2 were selected by way of example and it is to be understood that my novel system is not limited to these particular embodiments. I shall now describe in greater detail various features of my novel system.

In Fig. 3 I have illustrated conveying and transfer means for converting the stream of blanks delivered by the pug mill or other source of supply into smaller streams delivered to hacking stations where the blanks are placed upon tunnel kiln cars. In this figure the conveyor 50 is shown as carrying blanks 52 and transporting these blanks to the vicinity of a series of four transfer stations B of which only three are shown in this figure. Adjacent each of the transfer stations is an electric eye 54, 56 controlling the operation of an ejector 58. The electric eye 54, 56 or other suitable tripping mechanism which could be used in lieu thereof causes its plunger 58 to operate on every fourth blank and to move such blank onto a conveyor 60. This causes a gap in the blanks on the conveyor 50 so that the electric eye in the center of the figure operates in response to this gap and causes its ejector to push the blank following the gap onto its conveyor 60. The electric eye at the top of the figure likewise responds to the gaps in the blanks on conveyor 50, and causes its ejector to push onto its conveyor 60, the brick following such gap. The fourth electric eye (not shown) operates in response to the blanks remaining on conveyor 50 and causes its ejector to push such blanks onto a further conveyor 60. It is to be understood that the conveyor 50 is a relatively high-speed conveyor and the ejectors 58 operate with such speed that the blanks are moved onto the conveyors 60 without interference with succeeding blanks on the conveyor 50.

In Fig. 3 I have shown two hacking stations indicated generally by reference characters 62 and 64, and in general each conveyor 60 delivers a single row of blanks to one side of a hacking station. A car 66 is shown at each hacking station, and each hacking station includes a pair of platforms 68 and 70 on which men stand to load the cars with blanks. Referring to Fig. 4 it will be seen that the platforms 68 and 70 are attached to pairs of sleeves 72 and 74 mounted for vertical movement on tubular frames 76. The platforms 68 and 70 are suspended from cables 78 passing over pulleys 80 and adapted to be wound on a drum 82 rotated by a worm gear 84 and shaft 86 having a sprocket 88 and chain 90 leading to a second sprocket 92 which may be driven by a hand crank 94 for raising and lowering the platforms 68 and 70.

From a study of Fig. 5 it will be seen that each of the conveyors 60 is formed of three parts. One part 96 is mounted on the upper end of a support 98 and receives the blanks directly from the conveyor 50 from whence these blanks pass to a bridge section 100. One end of the bridge section 100 is mounted for movement in a curved slot 102 in the support 98, whereas the other end of this bridge section is attached to and moves with one of the platform supporting sleeves. The bridge section of the conveyor is provided with two belts 104 and 106 arranged side by side, and these belts continue throughout a generally horizontal portion 108 carried by the platform supports and vertically movable therewith. From the foregoing it will be apparent that as the platforms are moved up and down, the bridge sections 100 of the conveyor 60 assume different inclinations and the slotted supporting means at the lower end of the bridge sections adjust to compensate for differences in distance between the conveyors 96 and the horizontal sections 108 attached to the platform supports. Electric motors mounted in the supports 98 or any other suitable means may be provided for driving the conveyors 60.

In Fig. 6 I have shown an enlarged cross section of the bridge portion 100 of the conveyor 60. This figure clearly illustrates the separate belts 104 and 106, idler rollers 110 supporting the upper reaches of the belts, the bridge structure 112, and upwardly projecting sides 114 which extend slightly above the upper reaches of the belts 104 and 106 to prevent lateral displacement of the blanks 52.

It is important that the various layers of blanks stacked upon the car 66 be arranged in certain predetermined patterns in order that the hot gases may reach all of the blanks stacked upon the car and effect a substantially uniform cure thereof. In the conventional hacking operation this variegated arrangement of the different layers is a difficult and time-consuming operation which I have greatly simplified and expedited by the means which I shall now describe.

Suspended from the frames 76 and permanently attached thereto through a subsidiary frame 116 (Figs. 4 and 5) is a center divider or pattern member 118 comprising sides 120 and 122 pivotally connected at their upper ends and having their lower ends held in spaced relation by a spreader 124 controlled by handle 126. Each side carries a plurality of lugs or guides 128 arranged in different patterns at different levels, as most clearly shown in Fig. 5. These lugs are of such width and so spaced that a workman places a blank into engagement with each side of each lug so that the lugs establish the central sections of the patterns of the different layers stacked upon the car. After a car has been completely stacked with blanks, the handle 126 is operated to draw together the lower ends of the sides 120 and 122. This withdraws the lugs 128 from between the blanks and permits the car to be moved along its tracks 130 without interference by the center guide 118. An empty car may then be moved into position and the center guides spread by means of the handles 126. It will be understood that stops or other locating means are provided for positioning the cars 66 accurately with respect to this center guide and the other apparatus at the hacking stations.

I have also provided guide means for assisting the workman in quickly determining the positions of the blanks at the sides of the cars in the various layers. This means is best shown in Figs. 4, 7, and 8, and comprises a series of ten fingers 132 mounted on each platform support for vertical movement therewith. Referring to Fig. 7 it will be seen that the four central fingers or lugs 132 are mounted on a board 134 and that the finger or lug 132 at each side of this central group is mounted on a second board 136.

The two fingers or lugs at each end are mounted on a third board 138. The four centrally arranged fingers on the board 134 may be advanced to active position or retracted to inactive position by a lever 140. The intermediate board 136 is controlled by lever 142 and the long board 138 carrying the end fingers is controlled by lever 144. Referring particularly to Fig. 8, it will be seen that I have provided three telescopic members comprising an outer tube 146, an intermediate tube 148, and a rod 150 to which the levers 140, 142, and 144 are respectively attached for rotation thereof. Each telescopic member has a pair of pins 152, certain of which pins project through slots appropriately provided in outer members since the angular movement of such pins is relatively small. The pins 152 are linked to their respective boards 143, 136 and 138 so as to advance or retract the fingers carried by the boards in response to actuation of levers 140, 142 and 144, respectively.

From the foregoing it will be apparent that the platforms 68 and 70 can be lowered so that when an empty car is to be stacked the platforms are at a level such that the workmen can remove the brick from the conveyors or belts 108 and place them on the cars 66 without bending or stooping or other fatiguing movement. Since the belt conveyors are between the workman and the cars, it is necessary for the workman only to grab the blanks, lift them approximately one-half inch over the upper edges of the frame members 158 and place them upon the cars. Ordinarily, a workman will grip a blank in each hand and quickly place them against the center pattern member 118. After the center rows of the particular layer have been placed in position, these center rows form a guide or pattern indicator for intermediate rows in the same layer and the outside rows are positioned in accordance with the arrangement of the fingers 132 which can be varied for each layer by shifting more or less of these fingers into active position. As the various layers are stacked on the cars, the platforms 68 and 70 may be raised by the handle 94 so that the operator is at the optimum position for stacking the blanks of each layer without bending, stooping or other fatiguing operation. It is further to be noted that the workmen do not have to turn around or move their eyes from the cars during this stacking operation so that they can operate with maximum efficiency and speed, and minimum fatigue.

With my improved apparatus and arrangement the patterns of the various layers of blanks are more accurately arranged with the result that when the blanks are fired in the tunnel kiln, there is no loss through collapse of stacked blanks due to faulty stacking thereof. Furthermore, the more accurate stacking produces higher quality and more uniform brick.

While I have referred to the brick blanks as being cured by firing in a kiln, blanks for brick or like ceramic articles are frequently cured by simply drying, and in some climates this can be accomplished in the open. My system contemplates firing in a kiln, drying in the open, or other procedures for curing the stacked blanks.

From the foregoing description of illustrative embodiments of my invention it will be apparent that my novel system accomplishes the objects hereinbefore set forth, and that both my system and various features thereof are new and constitute important advances in the art.

It is to be understood that my invention is not to be limited to details herein illustrated or described, but includes all modifications, variations, and equivalents coming within the scope of the appended claims.

I claim:

1. In a system of the class described, a loading station having a frame for spanning a vehicle to be loaded, a center means carried by said frame for guiding the formation of different layers loaded on said vehicle, platforms carried by said frame on opposite sides of said vehicle, means for moving said platforms vertically on said frame, article-supplying conveyors attached to said platforms and movable therewith, side guiding means attached to said platforms for movement therewith, and means for selectively advancing elements of said side guiding means.

2. In a system of the class described, the combination of a first conveyor supplying a stream of articles, a plurality of conveyors arranged in parallel and all supplied by said first conveyor, plungers for transferring articles from said first-mentioned conveyor to said other conveyors, means for controlling said plungers, loading platforms to which said second-named conveyors conduct said articles, means for raising and lowering said platforms and portions of said second-named conveyors, said last-named conveyors having portions compensating for variations in elevation of said first-named portions, and fixed and movable stop means associated with said loading platforms arranged to give different patterns to different layers of articles stacked thereat.

3. In a system of the class described, a loading station having a frame for spanning a vehicle to be loaded and a center means carried by said frame for guiding the formation of different layers loaded on said vehicle, said means comprising sides pivotally connected at the top, means for separating and retracting the lower ends of said sides, and guiding lugs on said sides.

4. In a system of the class described, the combination of a first conveyor supplying a stream of articles, a plurality of conveyors supplied by said first conveyor, plungers for transferring articles from said first-mentioned conveyor to said other conveyors, means for controlling said plungers, loading platforms to which said second-named conveyors conduct said articles, and means for raising and lowering said platforms and portions of said second-named conveyors, said last-named conveyors having portions compensating for variations in elevation of said first-named portions.

5. In a system of the class described, a loading station having a frame adjacent a vehicle to be loaded, a center means carried by said frame for guiding the formation of different layers loaded on said vehicle, platforms carried by said frame on opposite sides of said vehicle, means for moving said platforms vertically on said frame, and side guiding means attached to said platforms for movement therewith.

6. In a system of the class described, a loading station having a frame for spanning a vehicle to be loaded, a center means carried by said frame for guiding the formation of different layers loaded on said vehicle, platforms carried by said frame on opposite sides of said vehicle, means for moving said platforms vertically on said frame, article-supplying conveyors attached to said platforms and movable therewith, and side guiding means attached to said platforms for movement therewith.

7. In a system of the class described, a loading station having a frame adjacent a vehicle to be loaded, means for carrying articles to the loading station, stop means substantially centered over the vehicle, said stop means being carried by said frame and being arranged to guide the formation of different layers of articles loaded on said vehicle, and side stop means attached to said frame for movement thereon, said side stop means also being arranged to guide the formation of layers of articles on said vehicle.

8. In a system of the class described, the combination of a first conveyor supplying a stream of articles, a plurality of conveyors supplied by said first conveyor, means including plungers for transferring articles from said first-mentioned conveyor to said other conveyors, article-responsive means controlling said plungers, loading platforms to which said second-named conveyors conduct said articles, means for raising and lowering said platforms and said second-named conveyors, horizontally retractable article positioning means vertically movable with said platforms, and means for retracting from their operative positions selected parts of said positioning means.

9. In a system of the class described, a station for loading articles on a vehicle, means for supplying such articles to said station, said articles being arranged on said vehicle in the form of layers having different patterns, guide fingers for determining such patterns, and means for independently advancing or retracting certain of said fingers with respect to other fingers.

10. In a system of the class described, a station for loading articles on a vehicle, means for supplying such articles to said station, said articles being arranged on said vehicle in the form of layers having different patterns, guide fingers for determining such patterns, and means for independently advancing or retracting certain of said fingers with respect to other fingers, said last-named means including telescoped members, arms attached thereto, finger-carrying boards moved by said arms, and hand levers affixed to said members.

11. Apparatus for handling brick and like ceramic articles, comprising a stacking station having a predetermined limiting border to which a stack of said articles extends, guide means positioned outside said station and extending over said border a predetermined distance within said station so as to give a guided pattern as such articles are stacked for drying or burning, and means for adjusting said guide means both vertically and horizontally with respect to the stacked articles to provide variation in the guided pattern of different layers of articles.

12. In a system of the class described for handling brick and like articles, a hacking station having a track for vehicles to be loaded, vertically adjustable platform means adapted to provide increased elevation as the loading of a vehicle proceeds, article-supplying conveyor means delivering articles at appropriate positions for any of said platform elevations, and stop means located within the stacking space above the vehicle for guiding the stacking of brick on said vehicles, to form different configurations at different heights, so as to provide for different arrangements of articles in different layers of the stack formed on a vehicle.

13. Apparatus for handling a plurality of discrete articles comprising means providing a loading station, a frame at said station for spanning a vehicle, said vehicle being adapted to receive a load of said articles, article-carrying conveyor means attached to said frame on each side of the vehicle station, an operator platform flanking each of said conveyor means and carried by said frame, means for maintaining said platforms in substantially constant vertical relation to the top of the load of articles upon said vehicle, stop means substantially centered over the vehicle, said stop means being carried by said frame and being arranged to guide the formation of different layers of articles loaded on said vehicle, and side stop means attached to said frame for moving thereon, said side stop means also being arranged to guide the formation of layers of articles on said vehicle.

14. Apparatus for handling a plurality of discrete articles comprising means providing a loading station, a frame at said station for spanning a vehicle, said vehicle being adapted to receive a load of said articles, vertically adjustable article-carrying conveyor means attached to said frame on each side of the vehicle station, a vertically adjustable operator platform flanking each of said conveyor means and carried by said frame, means for raising and lowering said platforms and said conveyor means, stop means substantially centered over the vehicle, said stop means being carried by said frame and being arranged to guide the formation of different layers of articles loaded on said vehicle, and side stop means attached to said frame for moving thereon, said side stop means also being arranged to guide the formation of layers of articles on said vehicle.

References Cited in the file of this patent

UNITED STATES PATENTS

| | | |
|---|---|---|
| 461,323 | Daniels | Oct. 13, 1891 |
| 961,314 | Penfield | June 14, 1910 |
| 1,128,671 | Evans | Feb. 16, 1915 |
| 1,225,523 | Surles | May 8, 1917 |

(References on following page)

| | | | | | |
|---|---|---|---|---|---|
| 1,385,867 | Fuller | July 26, 1921 | 1,980,411 | Kimball et al. | Nov. 13, 1934 |
| 1,490,235 | Smith et al. | Apr. 15, 1924 | 2,343,521 | Benning | Mar. 7, 1944 |
| 1,606,793 | Jaxon et al. | Nov. 16, 1926 | 2,362,079 | McCann | Nov. 7, 1944 |
| 1,666,451 | Horstkotte | Apr. 17, 1928 | 2,416,071 | Shonnard | Feb. 18, 1947 |
| 1,745,043 | Romine | Jan. 28, 1930 | 2,525,953 | Saxe | Oct. 17, 1950 |
| 1,779,210 | Davis | Oct. 21, 1930 | 2,569,966 | Arrigoni | Oct. 2, 1951 |
| 1,846,776 | Werner | Feb. 23, 1932 | 2,593,954 | Abreu | Apr. 22, 1952 |
| 1,905,700 | Greenholt | Apr. 25, 1933 | | | |